United States Patent
Hwang et al.

(10) Patent No.: US 9,279,479 B1
(45) Date of Patent: Mar. 8, 2016

(54) MULTISTAGE AUTOMATIC TRANSMISSION FOR VEHICLE

(71) Applicant: Hyundai Motor Company, Seoul (KR)

(72) Inventors: Seong Wook Hwang, Gunpo-si (KR); Kang Soo Seo, Yongin-si (KR); Jae Chang Kook, Hwaseong-si (KR); Hyu Tae Shim, Hwaseong-si (KR); Myeong Hoon Noh, Seongnam-si (KR); Seong Wook Ji, Ansan-si (KR); Won Min Cho, Hwaseong-si (KR); Wook Jin Jang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/668,007

(22) Filed: Mar. 25, 2015

(30) Foreign Application Priority Data

Nov. 3, 2014 (KR) ........................ 10-2014-0151376

(51) Int. Cl.
 *F16H 3/66* (2006.01)
(52) U.S. Cl.
 CPC .................. *F16H 3/66* (2013.01); *F16H 3/663* (2013.01); *F16H 2200/0065* (2013.01); *F16H 2200/2012* (2013.01); *F16H 2200/2023* (2013.01); *F16H 2200/2046* (2013.01); *F16H 2200/2097* (2013.01)
(58) Field of Classification Search
 CPC ............. F16H 3/62; F16H 3/66; F16H 3/663; F16H 3/666; F16H 2200/0065; F16H 2200/2012; F16H 2200/2046
 See application file for complete search history.

(56) References Cited

U.S. PATENT DOCUMENTS

| | | | |
|---|---|---|---|
| 8,303,455 B2 * | 11/2012 | Gumpoltsberger et al. | .. 475/280 |
| 2011/0045941 A1 * | 2/2011 | Gumpoltsberger et al. | .. 475/275 |

FOREIGN PATENT DOCUMENTS

| | | |
|---|---|---|
| JP | 2006-266481 A | 10/2006 |
| JP | 4339815 B2 | 10/2009 |
| JP | 2013-155809 A | 8/2013 |
| JP | 2013-204706 A | 10/2013 |
| JP | 5480926 B2 | 4/2014 |
| KR | 2011-0088536 A | 8/2011 |
| KR | 2012-0062718 A | 6/2012 |

* cited by examiner

Primary Examiner — Huan Le
(74) Attorney, Agent, or Firm — Morgan, Lewis & Bockius LLP

(57) ABSTRACT

A multistage automatic transmission may include an input shaft, a first composite planetary gear set including first and second planetary gear sets, each of the first and second planetary gear sets including three rotary members, a first brake, a first clutch, a second brake, a second clutch selectively connecting a pair of rotary members of the first composite planetary gear set that are selectively connected to each other, and a second composite planetary gear set arranged coaxially with the input shaft and including a plurality of rotary members, wherein the plurality of rotary members include a rotary member connected to the first composite planetary gear set, a rotary member connected to the input shaft, and a further rotary member connected to an output shaft, at least two rotary members of the plurality of rotary members in the second composite planetary gear set being connected to two friction members.

9 Claims, 6 Drawing Sheets

|  | B1 | B2 | CL4 | CL1 | CL2 | CL3 |
|---|---|---|---|---|---|---|
| First step | O |  | O |  | O |  |
| Second step |  |  | O | O | O |  |
| Third step | O |  | O | O |  |  |
| Fourth step |  |  | O | O |  | O |
| Fifth step | O |  |  | O |  | O |
| Sixth step |  |  |  | O | O | O |
| Seventh step | O |  |  |  | O | O |
| Eighth step |  | O |  |  | O | O |
| Ninth step | O | O |  |  |  | O |
| First rearward step | O | O | O |  |  |  |

| | B1 | B2 | B3 | CL1 | CL2 | CL3 |
|---|---|---|---|---|---|---|
| First step | O | | O | | O | |
| Second step | | | O | O | O | |
| Third step | O | | O | O | | |
| Fourth step | | | O | O | | O |
| Fifth step | O | | | O | | O |
| Sixth step | | | | O | O | O |
| Seventh step | O | | | | O | O |
| Eighth step | | O | | | O | O |
| Ninth step | O | O | | | | O |
| First rearward step | O | O | O | | | |

|  | B1 | B2 | B3 | CL1 | CL2 | CL3 |
|---|---|---|---|---|---|---|
| First step | O |  | O |  | O |  |
| Second step |  |  | O | O | O |  |
| Third step | O |  | O | O |  |  |
| Fourth step |  |  | O | O |  | O |
| Fifth step | O |  |  | O |  | O |
| Sixth step |  |  |  | O | O | O |
| Seventh step | O |  |  |  | O | O |
| Eighth step |  | O |  |  | O | O |
| Ninth step | O | O |  |  |  | O |
| First rearward step | O | O | O |  |  |  |

FIG. 9

MULTISTAGE AUTOMATIC TRANSMISSION FOR VEHICLE

CROSS REFERENCE TO RELATED APPLICATION

The present application claims priority to Korean Patent Application Number 10-2014-0151376 filed Nov. 3, 2014, the entire contents of which is incorporated herein for all purposes by this reference.

BACKGROUND OF THE INVENTION

1. Field of the Invention

The present invention generally relates to a multistage automatic transmission for a vehicle, and more particularly, to the configuration of a multistage transmission that can perform shifting in nine steps forward and one step rearward.

2. Description of Related Art

According to the development trend of vehicles in recent years, attempts have been made to manufacture vehicles having high efficiency and low fuel consumption in order to conform to increasingly stricter fuel consumption regulations, thus there have been efforts to develop an automatic transmission that has more steps of shifting to operate an engine more efficiently and has a simple and light configuration to improve fuel efficiency of a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects the present invention are directed to providing a multistage automatic transmission for a vehicle that performs shifting in nine steps forward and one step rearward, using a plurality of planetary gear sets, of which the entire structure is relatively simple and light, and which is manufactured at a low cost because it has no friction member between the planetary gear sets and no center support for supporting the friction member.

According to various aspects of the present invention, a multistage automatic transmission for a vehicle may include an input shaft through which power is input, a first composite planetary gear set including a first planetary gear set and a second planetary gear set sequentially arranged in an axial direction of the input shaft and each of the first and second planetary gear sets including three rotary members, in which a pair of rotary members among respective rotary members of the first and second planetary gear sets are directly connected to each other, another pair of rotary members are selectively connected to each other, and a rotary member of remaining rotary members is directly connected to the input shaft, a first brake restricting rotation of a final remaining rotary member of the first composite planetary gear set, a first clutch selectively connecting a rotary member of the another pair of rotary members which are selectively connected to each other in the first composite planetary gear set to the input shaft, a second brake restricting rotation of a rotary member of the first planetary gear set that is connected to the first clutch, a second clutch selectively connecting the another pair of rotary members of the first composite planetary gear set that are selectively connected to each other, and a second composite planetary gear set arranged coaxially with the input shaft and including a plurality of rotary members, wherein a rotary member thereof is connected to the first composite planetary gear set, wherein another rotary member thereof is connected to the input shaft, and wherein a further another rotary member thereof is connected to an output shaft, wherein at least two of the plurality of rotary members of the second composite planetary gear set are connected to two friction members.

The rotary members of the first planetary gear set may be a first sun gear, a first carrier, and a first ring gear, and the rotary members of the second planetary gear set may be a second sun gear, a second carrier, and a second ring gear, in which the first ring gear and the second carrier may be connected directly to each other, the first carrier and the second ring gear may be selectively connected to each other by the second clutch, the first sun gear may be connected to the first brake, the first carrier may be connected to the second brake, and the second sun gear may be connected directly to the input shaft.

The second composite planetary gear set may include a third planetary gear set and a fourth planetary gear set that are arranged sequentially from the first planetary gear set and the second planetary gear set in the axial direction of the input shaft and each of the third and fourth planetary gear sets may include three rotary members.

The rotary members of the third planetary gear set may be a third sun gear, a third carrier, and a third ring gear and the rotary members of the fourth planetary gear set may be a fourth sun gear, a fourth carrier, and a fourth ring gear, in which the third ring gear may be fixed, the third sun gear and the fourth sun gear may be connected directly to each other and connected to the first composite planetary gear set, the fourth carrier may be selectively connected to the input shaft by a third clutch that is one of the two friction members, and the fourth ring gear may be connected to the output shaft.

The third sun gear and the fourth sun gear, which may be connected directly to each other, may be connected directly to the second ring gear of the first composite planetary gear set, and the third carrier and the fourth ring gear may be selectively connected to each other by a fourth clutch that is a remaining one of the two friction members.

The rotary members of the third planetary gear set may be a third sun gear, a third carrier, and a third ring gear and the rotary members of the fourth planetary gear set may be a fourth sun gear, a fourth carrier, and a fourth ring gear, in which the third sun gear and the fourth ring gear may be arranged such that they are connected directly to each other and their rotation is restricted by a third brake that is one of the two friction members, the fourth sun gear may be connected to the first composite planetary gear set, the third ring gear may be selectively connected to the input shaft by a third clutch that is a remaining one of the two friction members, and the third carrier and the fourth carrier may be connected directly to each other and connected to the output shaft.

The fourth sun gear may be connected directly to the second ring gear of the first composite planetary gear set.

The second composite planetary gear set may be a ravigneaux planetary gear set with four rotary members, in which the four rotary members of the secondary composite planetary gear set may be a third sun gear of which rotation may be restricted by a third brake that is one of the two friction members, a fourth sun gear connected to the first composite planetary gear set, a third-fourth carrier connected to the input shaft by a third clutch that is one of the two friction members, and a third-fourth ring gear connected to the output shaft.

The first brake, the second brake, the first clutch, and the second clutch may be disposed outside the first composite planetary gear set without being disposed between the rotary members of the first composite planetary gear set and the second composite planetary gear set, and the two friction members connected to the rotary members of the second composite planetary gear set may be disposed outside the second composite planetary gear set without being disposed between the rotary members of the second composite planetary gear set.

According to the present invention, it is possible to perform nine steps of forward shifting and one step of rearward shifting using a plurality of planetary gear sets, while making the entire structure a transmission relatively simple and light, and reducing the manufacturing cost and the weight of the transmission by removing the necessity for friction members between the planetary gear sets and center supports for supporting the friction members.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are shown in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
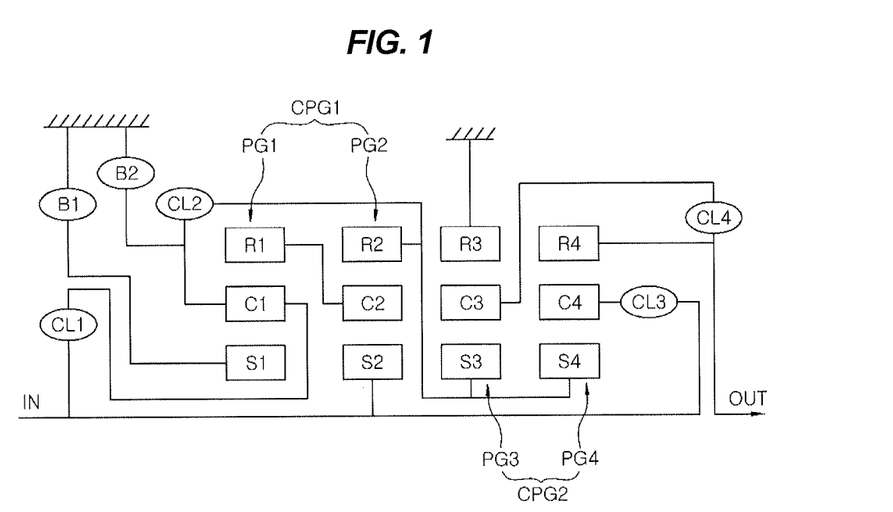
FIG. 1 is a diagram showing a configuration of an exemplary multistage automatic transmission for a vehicle according to an exemplary embodiment of the present invention.
Figure 4:
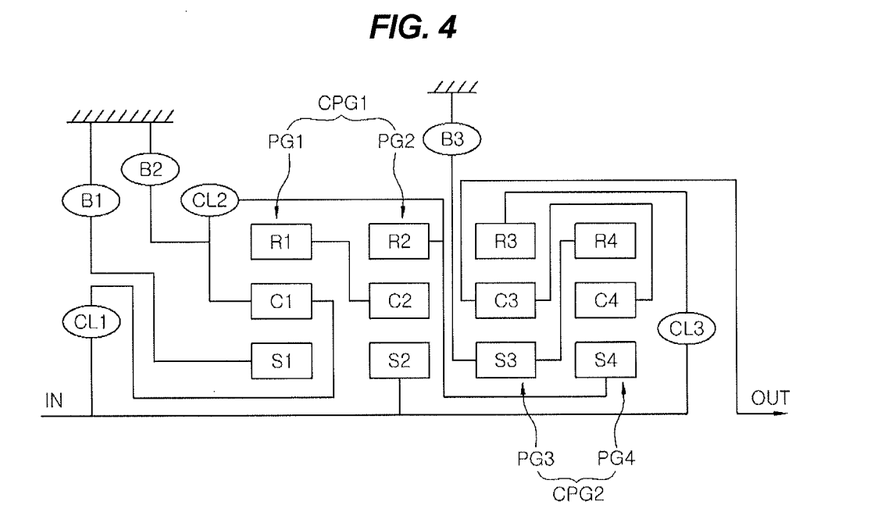
FIG. 4 is a diagram showing a configuration of an exemplary multistage automatic transmission for a vehicle according to an exemplary embodiment of the present invention.
Figure 7:
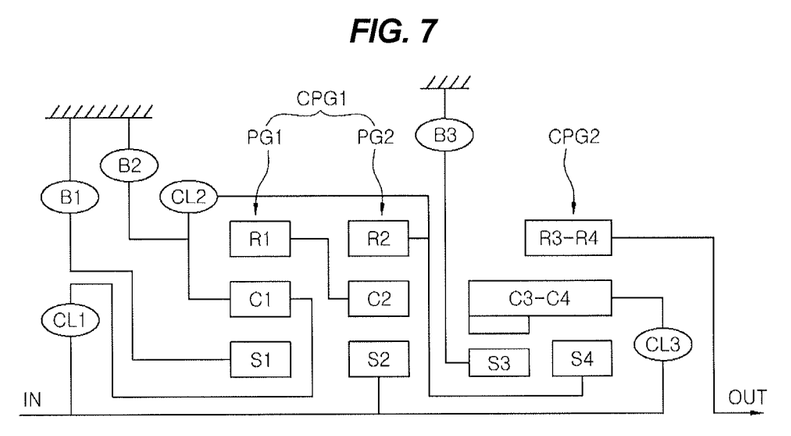
FIG. 7 is a diagram showing a configuration of an exemplary multistage automatic transmission for a vehicle according to an exemplary embodiment of the present invention.

Referring to FIG. 1, FIG. 4, and FIG. 7, multistage automatic transmissions for a vehicle according to various embodiments of the present invention include in common: an input shaft IN through which power is input, a first composite planetary gear set CPG1 that includes a first planetary gear set PG1 and a second planetary gear set PG2 sequentially arranged in the axial direction of the input shaft IN and each including three rotary members, in which a pair of rotary members among the respective rotary members of the first and second planetary gear sets are directly connected to each other, another pair of rotary members are connected/disconnected to/from each other, and another rotary member is directly connected to the input shaft IN, a first brake B1 that can restrict rotation of a final remaining rotary member of the first composite planetary gear set CPG1, a first clutch CL1 that connects/disconnects the rotary member of the first planetary gear set PG1 of the pair of rotary members, which are connected/disconnected to/from each other in the first composite planetary gear set CPG1, to/from the input shaft IN, a second brake B2 that restricts rotation of the rotary member of the first planetary gear set PG1 that is connected to the first clutch CL1, a second clutch CL2 that connects/disconnects the pair of rotary members of the first composite planetary gear set CPG1 that are connected/disconnected to/from each other, and a second composite planetary gear set CPG2 that is arranged coaxially with the input shaft IN and includes a rotary member connected to the first composite planetary gear set CPG1, another rotary member connected to the input shaft IN, and a further rotary member connected to an output shaft OUT, in which the rotary members of the second composite planetary gear set are connected to two friction members.

That is, the present invention includes the first planetary gear set CPG1 composed of the first planetary gear set PG1 and the second planetary gear set PG2, the first brake B1 and the second brake B2, and the first clutch CL1, the second clutch CL2, and the two friction members connected to the second composite planetary gear set CPG2, so it can achieve transmission gear ratios of nine steps forward and one step rearward.

In various embodiments, the first brake B1, the second brake B2, the first clutch CL1, and the second clutch CL2 are disposed not between the rotary members of the first composite planetary gear set CPG1 and the second composite planetary gear set CPG2, but outside the first composite planetary gear set CPG1 and the two friction members connected to the rotary members of the second composite planetary gear set CPG2 are disposed not between the rotary members of the second composite planetary gear set CPG2, but outside the second composite planetary gear set CPG2, so there is no need for center supports protruding inward from a transmission case for mounting friction members between the planetary gear sets, and accordingly, the entire structure of a transmission is simplified and the manufacturing cost and weight are reduced, resulting in improvement of fuel efficiency of a vehicle.

According to the various embodiments of the present invention, in the first composite planetary gear set CPG1, the rotary members of the first planetary gear set PG1 are a first sun gear S1, a first carrier C1, and a first ring gear R1 and the rotary members of the second planetary gear set PG2 are a second sun gear S2, a second carrier C2, and a second ring gear R2. The first ring gear R1 and the second carrier C2 are connected directly to each other, the first carrier C1 and the second ring gear R2 are connected/disconnected to/from each other by the second clutch CL2, the first sun gear S1 is connected to the first brake B1, the first carrier C1 is connected to the second brake B2, and the second sun gear S2 is connected directly to the input shaft IN.

In various embodiments shown in FIG. 1 and FIG. 4, the second composite planetary gear set CPG2 includes a third planetary gear set PG3 and a fourth planetary gear set PG4 that are arranged sequentially from the first planetary gear set PG1 and the second planetary gear set PG2 in the axial direction of the input shaft IN and each include three rotary members.

The rotary members of the third planetary gear set PG3 are a third sun gear S3, a third carrier C3, and a third ring gear R3 and the rotary members of the fourth planetary gear set PG4 are a fourth sun gear S4, a fourth carrier C4, and a fourth ring gear R4.

In various embodiments shown in FIG. 1, the third ring gear R3 is fixed and the third sun gear S3 and the fourth sun gear S4 are connected directly to each other and connected to the first composite planetary gear set CPG1, the fourth carrier C4 is connected/disconnected to/from the input shaft IN by a third clutch CL3 that is one of the two friction members, and the fourth ring gear R4 is connected to the output shaft OUT.

The third sun gear S3 and the fourth sun gear S4, which are connected directly to each other, are connected directly to the second ring gear R2 of the first composite planetary gear set CPG1, and the third carrier C3 and the fourth ring gear R4 are connected/disconnected to/from each other by a fourth clutch CL4 that is the other one of the two friction members.

Figure 2:
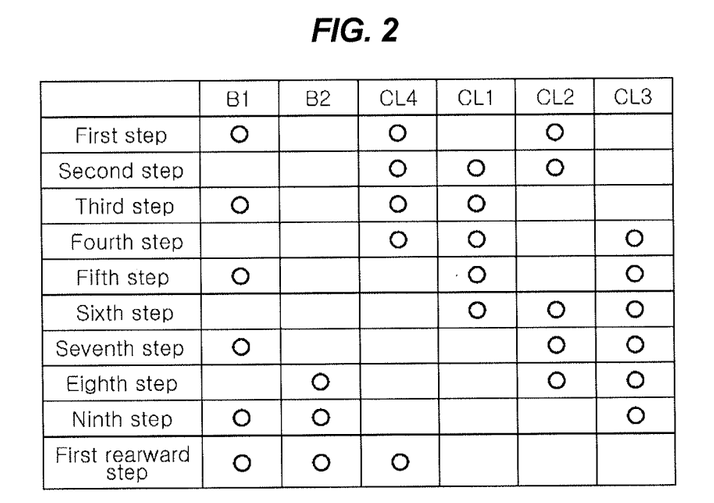
FIG. 2 is an operation table for shifting of the exemplary multistage automatic transmission according to an exemplary embodiment of the present invention.
Figure 3:
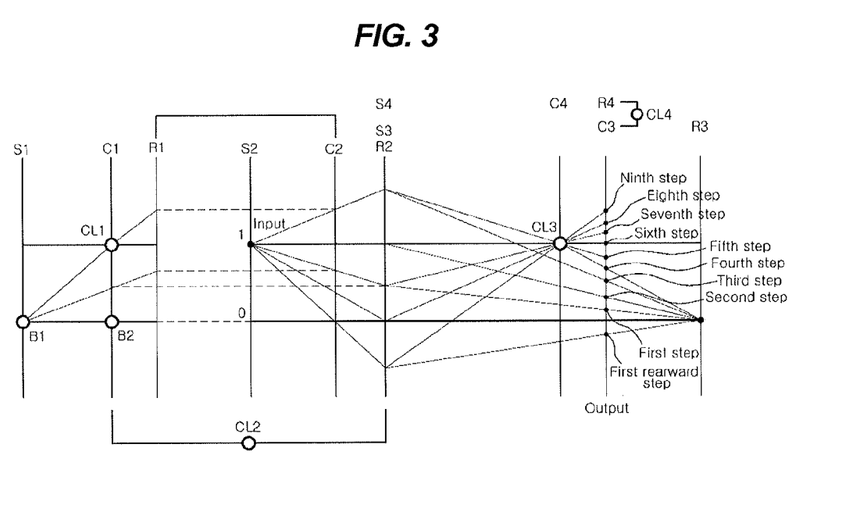
FIG. 3 is a lever diagram of the exemplary multistage automatic transmission according to an exemplary embodiment of the present invention.

According to various embodiments having the configuration of the present invention, the transmission can achieve nine steps of forward shifting and one step of rearward shifting, as shown in FIG. 3, by operating in accordance with the operation table shown in FIG. 2.

The various embodiments shown in FIG. 4 are substantially similar to the configuration shown in FIG. 1, except that the third sun gear S3 and the fourth ring gear R4 are connected directly to each other and their rotation is restricted by a third brake B3 that is one of the two friction members, the fourth sun gear S4 is connected to the first composite planetary gear set CPG1, the third ring gear R3 is connected/disconnected to/from the input shaft IN by a third clutch CL3 that is the other one of the two friction members, the third carrier C3 and the fourth carrier C4 are connected directly to each other and connected to the output shaft OUT, and the fourth sun gear S4 is connected directly to the second ring gear R2 of the first composite planetary gear set CPG1.

Figure 5:
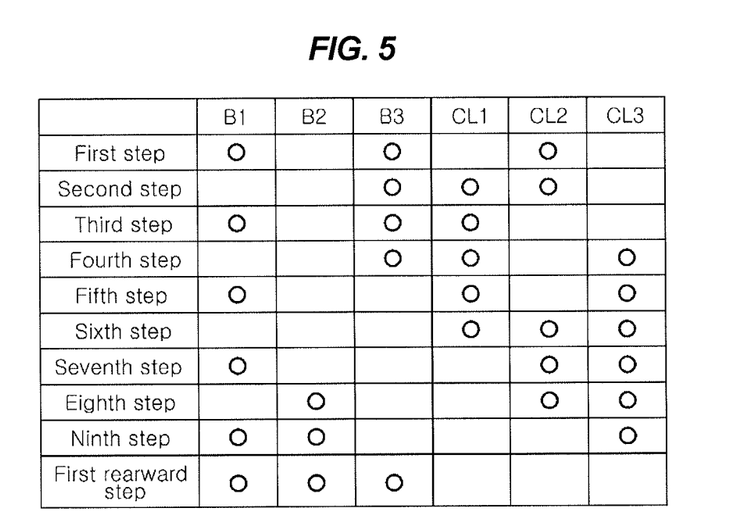
FIG. 5 is an operation table for shifting of the exemplary multistage automatic transmission of FIG. 4, according to an exemplary embodiment of the present invention.
Figure 6:
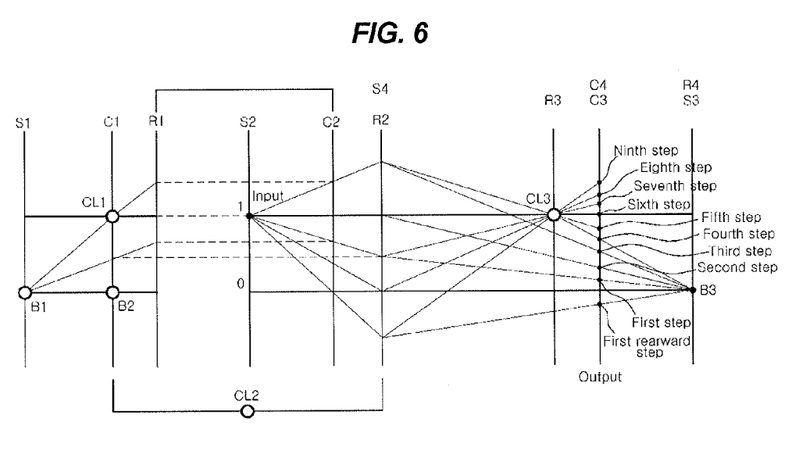
FIG. 6 is a lever diagram of the exemplary multistage automatic transmission of FIG. 4, according to an exemplary embodiment of the present invention.

The transmission of the various embodiments shown in FIG. 3 can achieve nine steps of forward shifting and one step of rearward shifting, as shown in FIG. 6, by operating in accordance with the operation table shown in FIG. 5.

FIG. 7 shows various embodiments of the present invention, which is, as compared with the various embodiments shown in FIG. 1 and the various embodiments shown in FIG. 4, the same in the arrangement of the first composite planetary gear set CPG1 and the friction members connected to the first composite planetary gear set CPG1, but different in that the second composite planetary gear set CPG2 is a ravigneaux type planetary gear set with fourth rotary members.

The four rotary members are a third sun gear S3 of which rotation is restricted by a third brake B3 that is one of the two friction members, a fourth sun gear S4 connected to the first composite planetary gear set CPG1, a third-fourth carrier C3-C4 connected to the input shaft IN by a third clutch CL3 that is the other one of the two friction members, and a third-fourth ring gear R3-R4 connected to the output shaft OUT.

Figure 8:
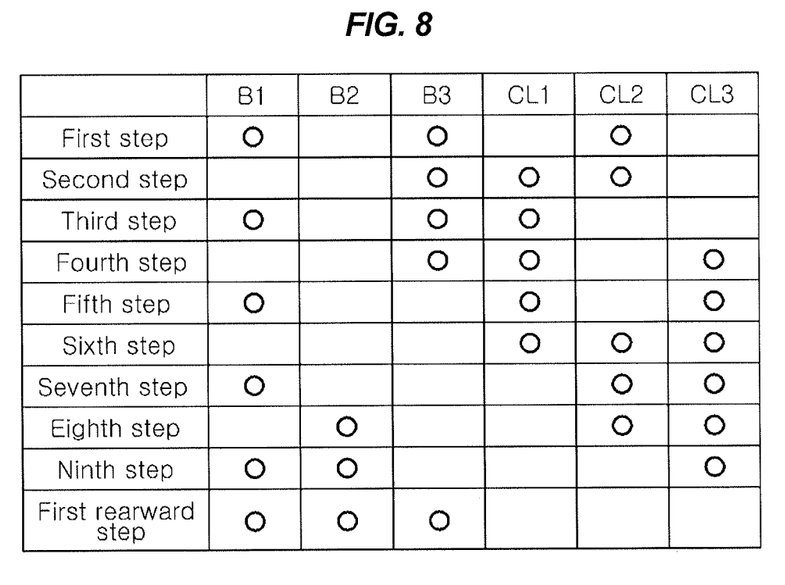
FIG. 8 is an operation table for shifting of the exemplary multistage automatic transmission of FIG. 7, according to an exemplary embodiment of the present invention.
Figure 9:
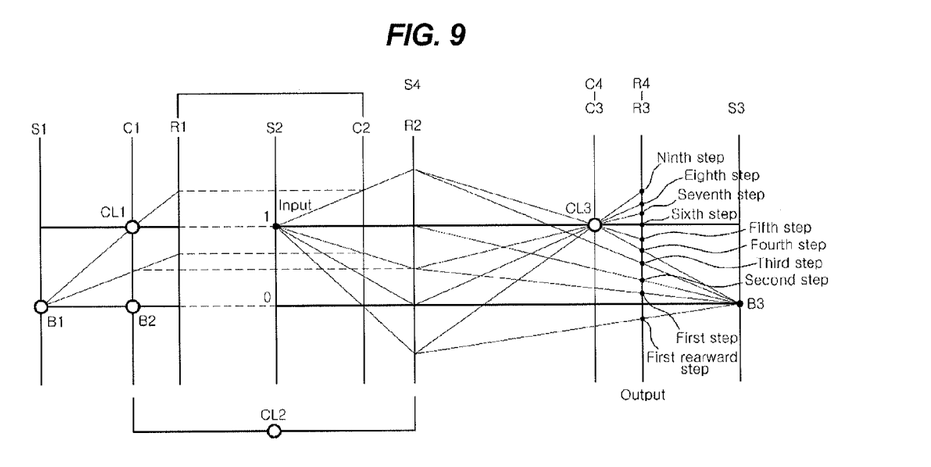
FIG. 9 is a lever diagram of the exemplary multistage automatic transmission of FIG. 7, according to an exemplary embodiment of the present invention.

The transmission having the configuration according to the various embodiments shown in FIG. 7 can achieve transmission gear ratios of nine steps forward and one step rearward, as shown in FIG. 9, by operating in accordance with the operation table shown in FIG. 8.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multistage automatic transmission for a vehicle, comprising:
    an input shaft through which power is input;
    a first composite planetary gear set including a first planetary gear set and a second planetary gear set sequentially arranged in an axial direction of the input shaft and each of the first and second planetary gear sets including three rotary members, in which a pair of rotary members among respective rotary members of the first and second planetary gear sets are directly connected to each other, another pair of rotary members are selectively connected to each other, and a rotary member of the second planetary gear set, of remaining rotary members is directly connected to the input shaft;
    a first brake restricting rotation of a final remaining rotary member of the first composite planetary gear set;
    a first clutch selectively connecting a rotary member of the another pair of rotary members, which are selectively connected to each other in the first composite planetary gear set, directly to the input shaft;
    a second brake restricting rotation of a rotary member of the first planetary gear set that is connected to the first clutch;
    a second clutch selectively connecting the another pair of rotary members of the first composite planetary gear set that are selectively connected to each other; and
    a second composite planetary gear set arranged coaxially with the input shaft and including a plurality of rotary members, wherein a rotary member thereof is connected to the first composite planetary gear set,
wherein another rotary member thereof is connected to the input shaft, and
wherein a further another rotary member thereof is connected to an output shaft,
wherein at least two of the plurality of rotary members of the second composite planetary gear set are connected to two friction members, and
wherein:
the first brake, the second brake, the first clutch, and the second clutch are disposed outside the first composite planetary gear set without being disposed between the rotary members of the first composite planetary gear set and the second composite planetary gear set, and
the two friction members connected to the rotary members of the second composite planetary gear set are disposed outside the second composite planetary gear set without being disposed between the rotary members of the second composite planetary gear set.

2. The multistage automatic transmission of claim 1, wherein the three rotary members of the first planetary gear set are a first sun gear, a first carrier, and a first ring gear, and
the three rotary members of the second planetary gear set are a second sun gear, a second carrier, and a second ring gear, wherein
the first ring gear and the second carrier are connected directly to each other,
the first carrier and the second ring gear are selectively connected to each other by the second clutch,
the first sun gear is connected to the first brake,
the first carrier is connected to the second brake, and
the second sun gear is connected directly to the input shaft.

3. The multistage automatic transmission of claim 2, wherein the second composite planetary gear set is a ravigneaux planetary gear set with four rotary members, wherein
the four rotary members of the secondary composite planetary gear set are a third sun gear of which rotation is restricted by a third brake that is one of the two friction members, a fourth sun gear connected to the first composite planetary gear set, a third-fourth carrier connected to the input shaft by a third clutch that is the other one of the two friction members, and a third-fourth ring gear connected to the output shaft.

4. The multistage automatic transmission of claim 3, wherein the fourth sun gear is connected directly to the second ring gear of the first composite planetary gear set.

5. The multistage automatic transmission of claim 2, wherein the second composite planetary gear set includes a third planetary gear set and a fourth planetary gear set that are arranged sequentially from the first planetary gear set and the second planetary gear set in the axial direction of the input shaft and each of the third and fourth planetary gear sets include three rotary members.

6. The multistage automatic transmission of claim 5, wherein the rotary members of the third planetary gear set are a third sun gear, a third carrier, and a third ring gear and the rotary members of the fourth planetary gear set are a fourth sun gear, a fourth carrier, and a fourth ring gear, wherein
the third ring gear is fixed,
the third sun gear and the fourth sun gear are connected directly to each other and connected to the first composite planetary gear set,
the fourth carrier is selectively connected to the input shaft by a third clutch that is one of the two friction members, and
the fourth ring gear is connected to the output shaft.

7. The multistage automatic transmission of claim 6, wherein the third sun gear and the fourth sun gear, which are connected directly to each other, are connected directly to the second ring gear of the first composite planetary gear set, and
the third carrier and the fourth ring gear are selectively connected to each other by a fourth clutch that is a remaining one of the two friction members.

8. The multistage automatic transmission of claim 5, wherein the rotary members of the third planetary gear set are a third sun gear, a third carrier, and a third ring gear and the rotary members of the fourth planetary gear set are a fourth sun gear, a fourth carrier, and a fourth ring gear, wherein
the third sun gear and the fourth ring gear are arranged such that they are connected directly to each other and rotation thereof is restricted by a third brake that is one of the two friction members,
the fourth sun gear is connected to the first composite planetary gear set,
the third ring gear is selectively connected to the input shaft by a third clutch that is a remaining one of the two friction members, and
the third carrier and the fourth carrier are connected directly to each other and connected to the output shaft.

9. The multistage automatic transmission of claim 8, wherein the fourth sun gear is connected directly to the second ring gear of the first composite planetary gear set.

* * * * *